United States Patent [19]

Di Paolo

[11] Patent Number: 4,600,206

[45] Date of Patent: Jul. 15, 1986

[54] DEVICE FOR TRANSFORMING CYCLES OR SIMILAR INTO MULTIPLE CAPACITY VEHICLES FOR MORE OCCUPANTS

[76] Inventor: Giancarlo Di Paolo, Via Canzone del Piave, 51, 00144 Roma, Italy

[21] Appl. No.: 637,366

[22] Filed: Aug. 3, 1984

[30] Foreign Application Priority Data

Jul. 18, 1984 [IT] Italy .................. 48587 A/84

[51] Int. Cl.⁴ .......................................... B62K 13/02
[52] U.S. Cl. ...................................... 280/231; 280/273
[58] Field of Search ............... 280/231, 209, 222, 273; 297/195

[56] References Cited

U.S. PATENT DOCUMENTS

| | | | |
|---|---|---|---|
| 2,616,734 | 11/1952 | Olson | 280/273 X |
| 2,715,342 | 8/1955 | Ridgway | 280/273 X |
| 3,092,362 | 6/1963 | Walsh | 280/231 X |
| 3,913,944 | 10/1975 | Blow | 280/231 |

FOREIGN PATENT DOCUMENTS

| | | | |
|---|---|---|---|
| 844415 | 7/1952 | Fed. Rep. of Germany | 280/231 |
| 2422545 | 11/1979 | France | 280/231 |
| 10476 | of 1898 | United Kingdom | 280/231 |

*Primary Examiner*—John A. Pekar
*Attorney, Agent, or Firm*—Beveridge, DeGrandi and Weilacher

[57] ABSTRACT

A single rider bicycle is adapted to be transformable to a two rider bicycle, and comprises a stationary tubular framework structure and an extendible tubular framework structure. The structures are telescopically coupled. The stationary structure includes a stationary saddle and support means for a removable saddle. A permanent pedal crank is disposed upon said stationary structure while the extendible structure includes a removable pedal crank. Removable coupling means are provided for coupling the permanent and removable pedal cranks when the bicycle is extended to its tandem position. Means are further provided for enabling horizontal and vertical adjustment of the removable saddle.

8 Claims, 10 Drawing Figures

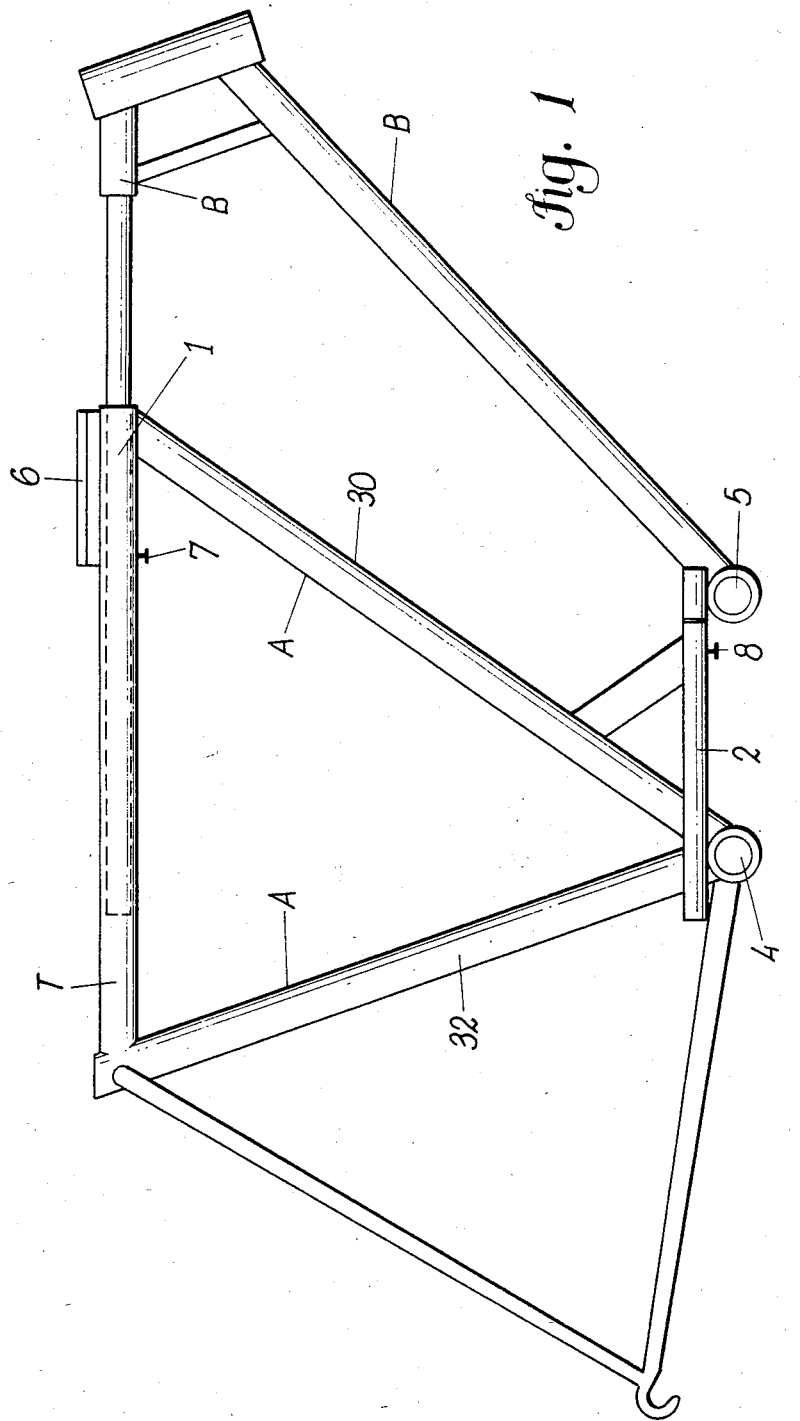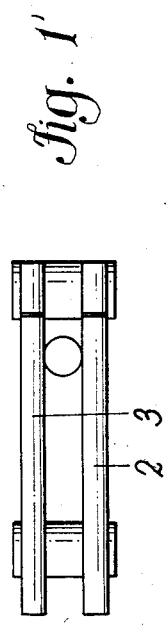

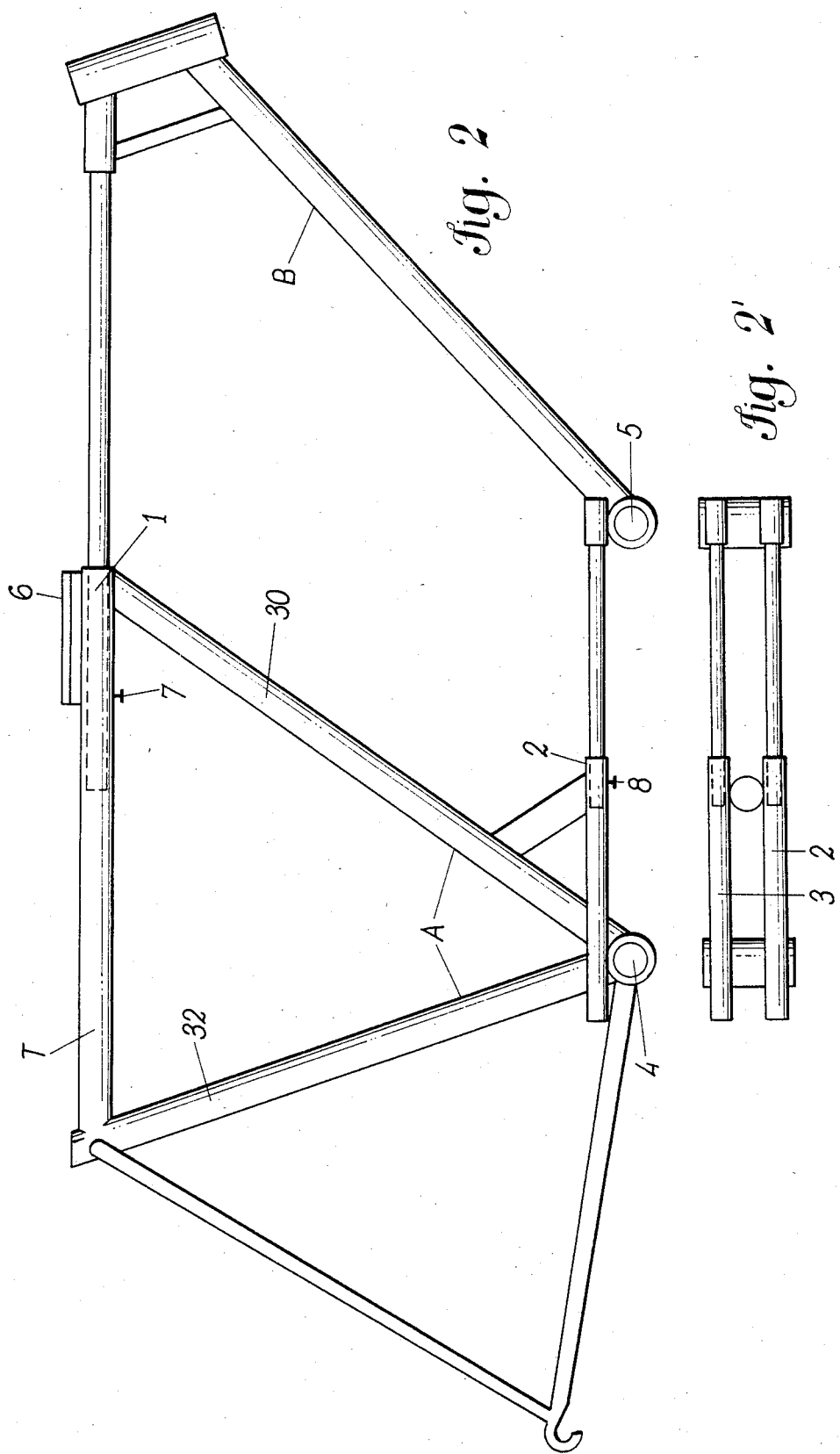

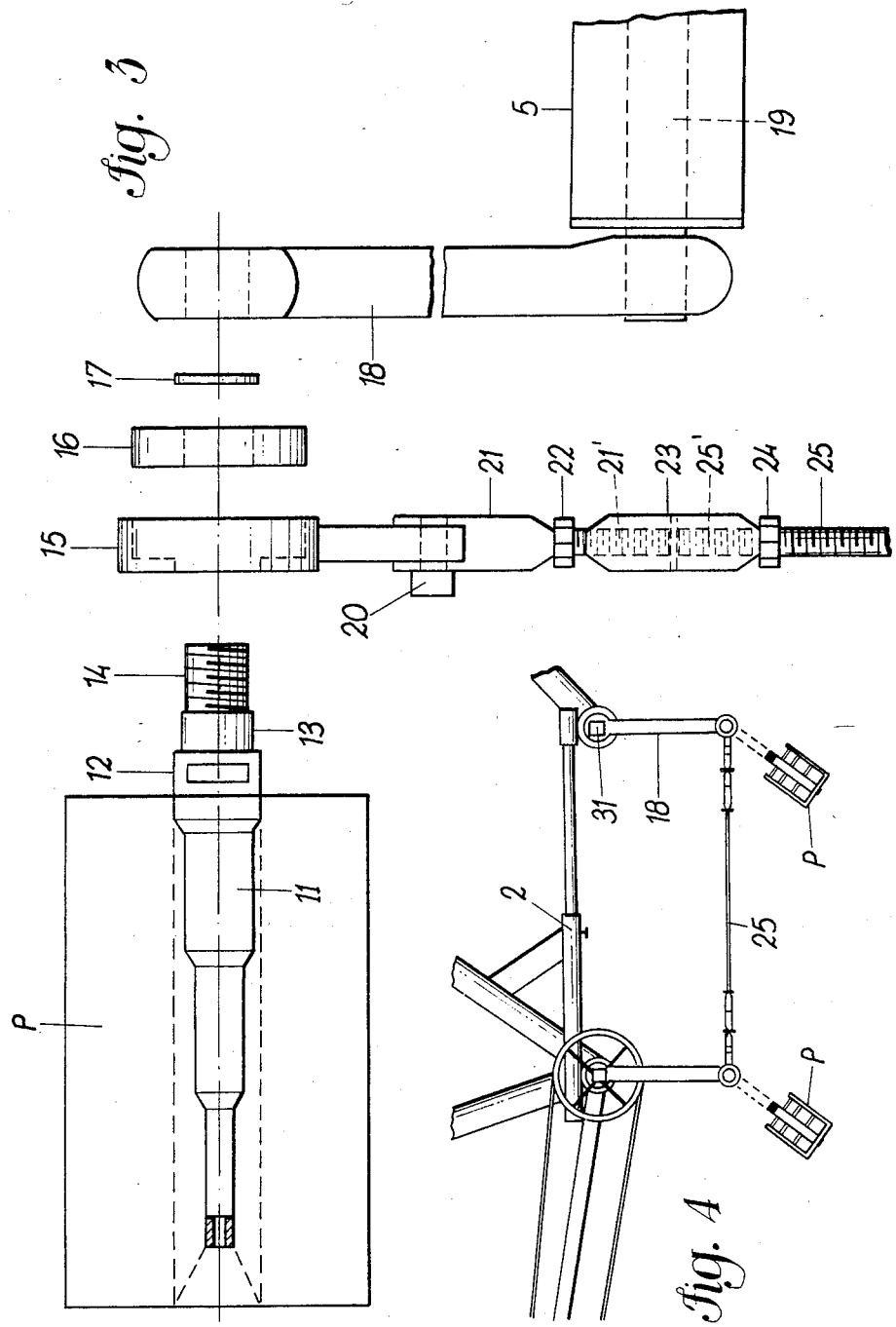

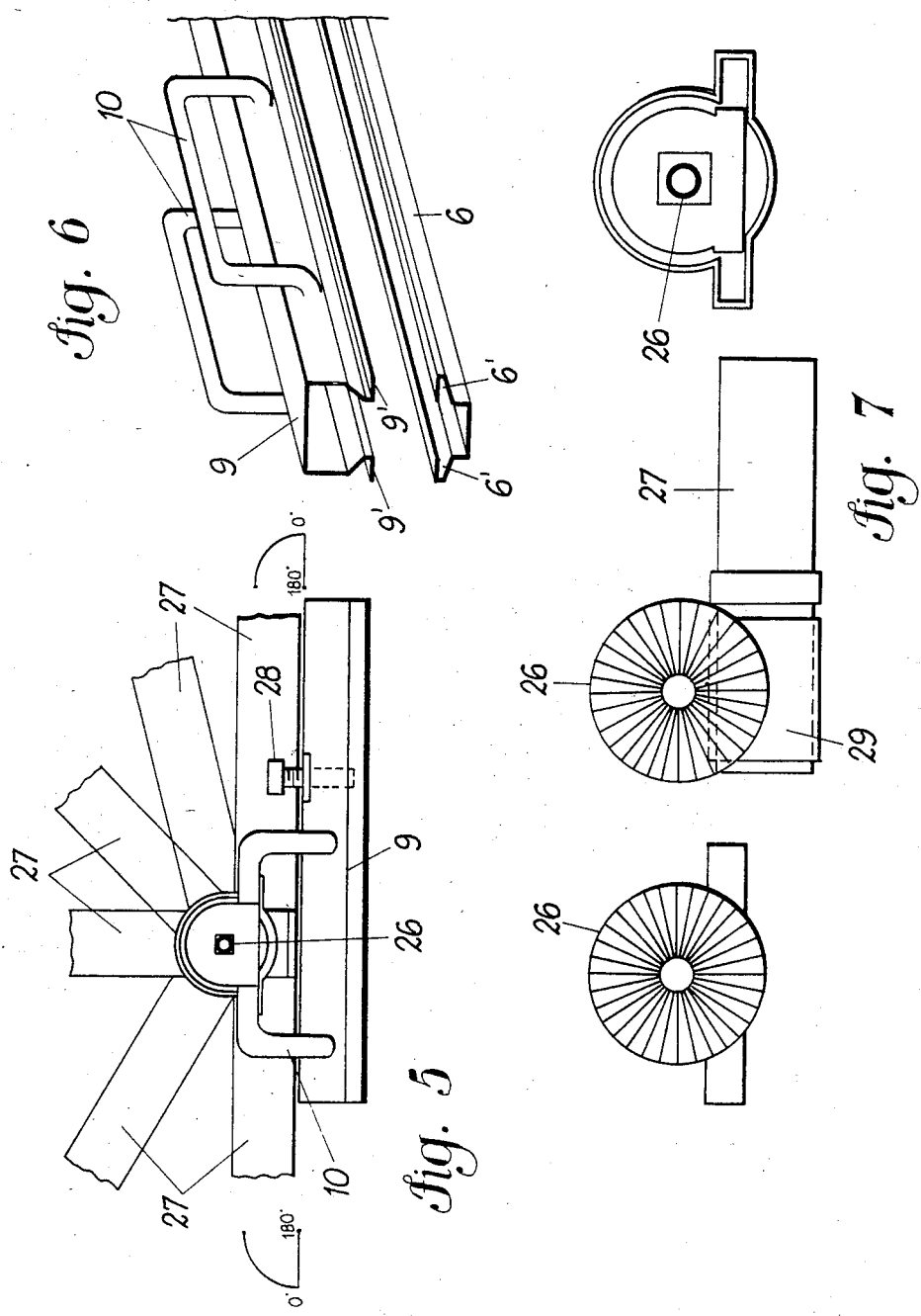

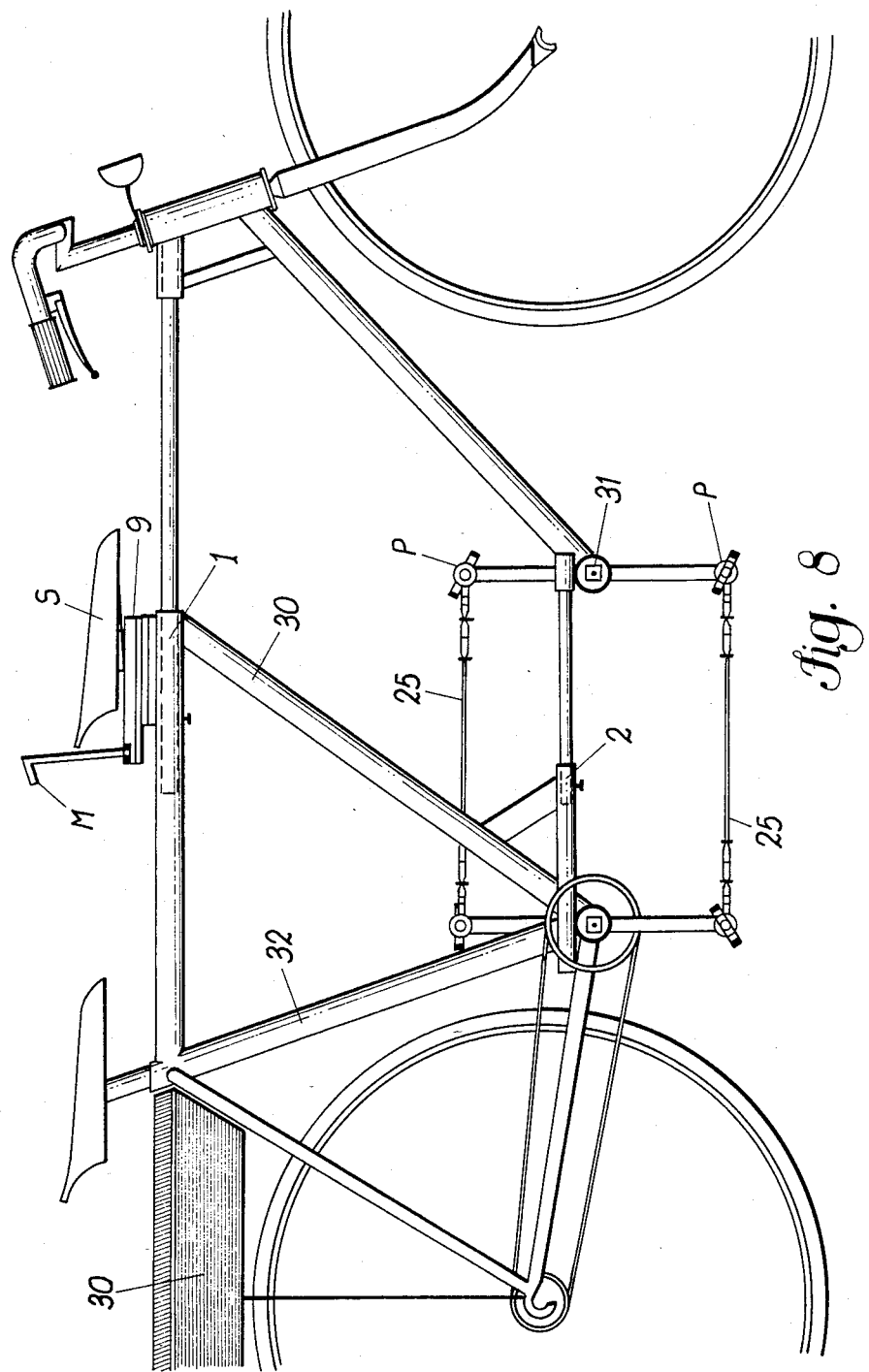

DEVICE FOR TRANSFORMING CYCLES OR SIMILAR INTO MULTIPLE CAPACITY VEHICLES FOR MORE OCCUPANTS

BACKGROUND OF THE INVENTION

The present invention is a single rider bicycle adapted to be transformable to a two or more rider bicycle, comprising an extendible tubular framework structure and an attachable secondary pedal and pedal crank mechanism.

It is known that bicycles have been constructed in two different arrangements namely, bicyles for only one rider, and tandems, adapted to carry two or more riders who each contribute to advancing the bicycle by means of a pedal and pedal crank mechanism for each rider. The pedal and pedal crank mechanisms are in turn coupled, by means of block chains.

From the German Pat. No. 844,415, it is known that earlier bicycles also include a saddle located above the back wheel to accommodate a second rider. In such bicycles, the second rider contributes to powering the bicycle by means of a secondary pedal and pedal crank mechanism operating directing upon the back wheel hub. However, embodiments having the second saddle over the back wheel, utilize a frame of limited dimension, with the result that the two riders must make use of limited space, with consequent evident uneasiness and difficulty in handling.

Bicycles functioning either singly or as a tandem are also known. One such bicycle, disclosed in British Pat. No. 10,476 of 1898, is characterized by an extendible frame for receiving two riders.

The present invention provides a kind of cycle never realized until now, which accordingly can be used, as a single or a tandem vehicle. The invention comprises a variable frame, including a stationary frame structure and an extendible frame structure wherein telescopically engaging tubes on said structures permit selective association of the structures in spaced-apart relationship. A removable pedal and pedal crank mechanism, adapted to be installed upon said extendible frame, couples, by means of bars or connecting rods, to the permanent pedal and pedal crank group for cooperative locomotion of the bicycle. A saddle support tube attachable to the stationary frame structure, and adapted to rotate, together with a removable saddle connected thereto from 0° to 180°, in both directions is also provided. A luggage container stores all of the above mentioned elements when they are not used.

DESCRIPTION OF THE DRAWINGS

The present invention will be explained in detail according to the attached drawings in which a preferred embodiment is shown.

FIG. 1 is an side view showing a frame which has three telescoping tubular elements;

FIG. 1' is a plan view of a lower portion of the structure of FIG. 1.

FIG. 2 shows the frame of FIG. 1 in its fully elongated condition.

FIG. 2' is a view similar to FIG. 1', showing the lower telescoping elements in their fully elongated position.

FIG. 3 is an exploded view, showing the removable pedal group, and the elements for connecting the group to the permanent pedal group.

FIG. 4 is a side elevational view showing the connection between the two pedal groups with the frame structure in their elongated position.

FIGS. 5 and 6, respectively, show a lateral view and an axonometric, exploded view of the saddle support structure.

FIG. 7 is a sectional view showing means for fastening the removable saddle to a saddle support.

FIG. 8 is an elevated view showing in partial transparency, the central part of a bicycle in accordance with the present invention in the tandem configuration.

DETAILED DESCRIPTION OF A PREFERRED EMBODIMENT

The figures show a device for transforming cycles into vehicles for two riders, comprising a stationary tubular framework structure A and a telescopically extendible tubular framework structure B coupled with the structure A by means of an upper telescopic tube and two lower telescopic tubes 2 and 3, which may be placed above or below pedal crank housings 4 and 5. A T-shaped support element 6 is provided to mount a removable saddle S, said element 6 being rigidly connected to the upper horizontal tube T.

As shown in FIGS. 6 and 7, the removable saddle S comprises a rectangular box-shaped element 9 having two parallel side wings 9', two U-shaped uprights 10 each fastened to one side wall of box-shaped element 9, a saddle supporting tube 27, and first adjustable fastening means 26 for fastening saddle supporting tube 27 at one of its ends to uprights 10 at any desired angle. Similar second adjustable fastening means are provided for fastening saddle S onto the other end of saddle supporting tube 27 to adjust the saddle to a horizontal position, in dependance on the angular position of tube 27.

Saddle support element 6 on the stationary horizontal tube T has two parallel oblong guides 6' for slidably receiving wings 9' of box-shaped element 9. A screw 28 is provided for securing the box-shaped element 9 on saddle support element 6 in the desired saddle position.

With further reference to stationary frame A shown in FIGS. 1 and 8, frame A includes a forward slanting tube 30 and a rear slanting tube 32 connected at their lower ends to form a V-shape. The upper ends of the V thus connect to upper horizontal tube T. The angle $\theta$ defined by the connection of forward tube 30 and horizontal tube T is acute. As seen in the Figures, forward tube 30 connects to tube T under support element 6.

According to the present invention there are provided adjustable coupling means for coupling the permanent pedals with the removable pedals. Such means comprises a connection bar 25 having threaded ends 25', a fastening bar 21 having one end adapted to be coupled with the pedal axis 11 and another threaded end 21', a cylindrically shaped element 23 having a threaded hole at both of its ends for engaging the threaded ends of the connection bar 25 and the fastening bar 21. The threaded ends and threaded holes are threaded in opposite directions, so that rotation of cylindrically shaped element 23 in a first direction would shorten the coupling means while rotation in the opposite direction would lengthen such.

As is shown in FIG. 3, bar assembly 21, 25 may be easily coupled with the conical axis 11 of the pedal P by engaging the fork shaped end of fastening bar 21 with a projection of a support 15 of a ball-bearing 16 and then securing them by means of screw pin 20.

In FIG. 3 there is shown the single elements of a conventional assembling group of the bicycle, such as key connection 12 for mounting and removing the pedal, a housing 13 of the ball-bearing 16, threaded end 14 of the conical axis for connecting the pedal to the pedal crank 18, a separation washer 17 and a central movement axis 19 of the pedal crank 18.

The adjusted position of the bar assembly 21, 23, 25 may be secured by nuts 22 and 24.

The screw 28 allows the quick locking and release between the elements 9 and 6. A housing ring of saddle supporting tube 27 is indicated by reference numeral 29.

The removable saddle S together with back handle bars M, are easily removable and may be placed into the luggage container 30.

Disconnection of the permanent and removable pedal groups is carried out by removing fixing pins 31 which connect pedal cranks 18 to central movement axis 19, and also removing the connection bolt 20 between the housing 15 and the fastening bar 21, so as to detach the removable pedal crank group together with the connection mechanism from the back or permanent group. The detached group then is placed in luggage container 30.

It is evident to those skilled in the art, that in accordance with the present invention, a similarly adapted motor bike or "moped" can be provided to accommodate more than one pedalling rider.

I claim:

1. A convertible bicycle adapted to accommodate one or more riders comprising a stationary tubular framework structure and a telescopically extendible tubular framework structure, said framework structures having telescopically engaging upper horizontal tubes, and horizontal lower telescopically engaging means for selectively spacing-apart said stationary and said extendible structures; a stationary saddle on said stationary framework structure; a removable saddle; support means rigidly fixed onto said upper horizontal tube of said stationary framework for securing said removable saddle forwardly of said stationary saddle; a permanent pedal crank and pedal group; a removable pedal crank and pedal group; said stationary framework structure further including a first slant tube and a second slant tube respectively connected at their upper ends with the forward and rearward ends of said upper horizontal tube, said first and second tubes being connected together at their lower ends to form permanent pedal crank housing; a first rear wheel fork extending from the rearward end of said upper horizontal tube to engage the rear wheel hub, a second rear wheel fork connected at one end of the lower end of said first fork and connected at its other end to the lower ends of said first and second slant tubes; said extendible framework structure including a third slant tube, a fore wheel fork supported in said third slant tube, a handle bar connected to said fore wheel fork, a fourth slant tube having its upper end connected with the lower portion of said third slant tube and its lower end connected to one end of said lower telescopically engaging means of said extensible framework structure; said lower end of said fourth slant tube having a housing for mounting a removable pedal crank; adjustable coupling means for coupling the permanent pedals and said removable pedals; and fastening means on said stationary horizontal upper tube and said stationary lower telescopically engaging means for securing therein said extendible upper horizontal tube and said extendible lower telescopically engaging means in selective spaced-apart relation.

2. A bicycle as claimed in claim 1 wherein said removable saddle includes a rectangular box-shaped element having two parallel side wings, two U-shaped uprights each fastened onto one side wall of said box-shaped element, a saddle supporting tube, first fastening means for fastening said saddle supporting tube at its one end to said uprights at any desired angle position, second fastening means for fastening said saddle onto the other end of said saddle supporting tube to adjust said saddle to a horizontal position, said saddle support means on said stationary horizontal tube having two parallel oblong guides for slidably receiving said wings on said box shaped element, and means for securing said box-shaped element on said saddle support means at the desired saddle position.

3. A bicycle as claimed in claim 1 wherein said adjustable coupling means for coupling said permanent pedals with said removable pedals includes a connecting bar having threaded ends, a fastening bar having one end adapted to be coupled with a pedal hub and another threaded end, a cylindrically shaped element having a threaded hole at both ends for engaging said threaded ends of said connection bar and said fastening bar, said threaded ends and said threaded holes being threaded in opposite directions, whereby the rotation of said cylindrically shaped element in one direction would extend said coupling means to a desired length.

4. A bicycle claimed in claim 1 wherein said lower horizontal telescopically engaging means comprises two pairs of telescopically engaging tubes.

5. A bicycle as claimed in claim 4 wherein said first and second slant tubes are connected to each other below said lower horizontal telescopically engaging means.

6. A bicycle as claimed in claim 5 wherein said stationary tubular framework structure further comprises a short tube having one end rigidly connected with said lower horizontal telescopically engaging means and the other end connected to said first slant tube.

7. A bicycle as claimed in claim 4 wherein said support means for the removable saddle are fixed at about just above the connection of said first slant tube with said horizontal tube.

8. A bicycle as claimed in claim 4 wherein all of said pedal crank housings are horizontally aligned.

* * * * *